United States Patent Office 3,465,387
Patented Sept. 9, 1969

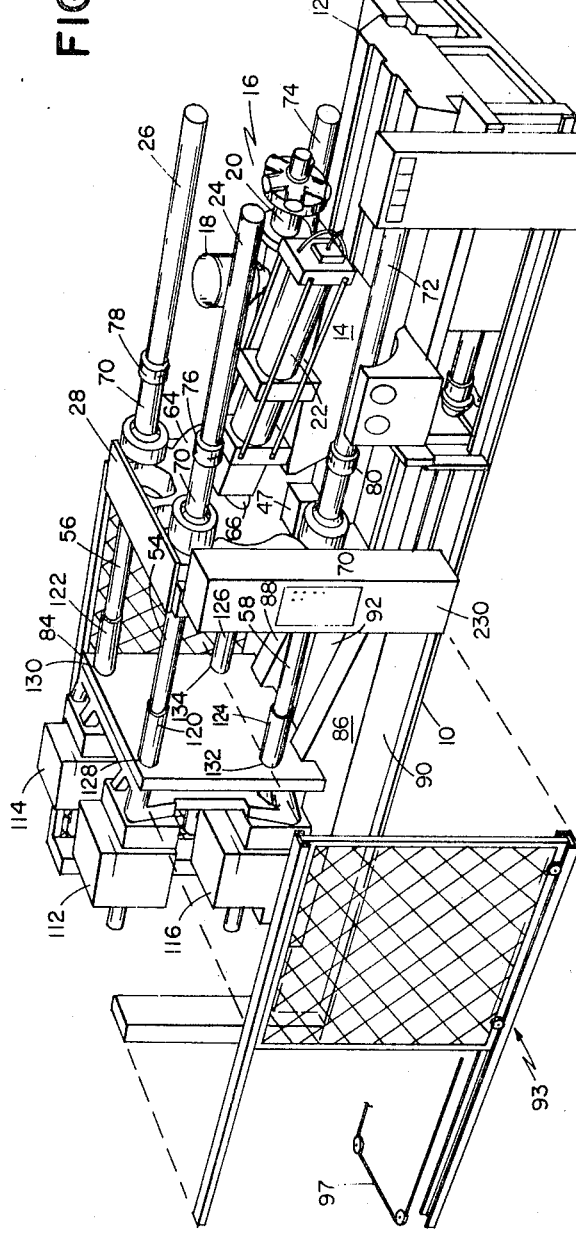
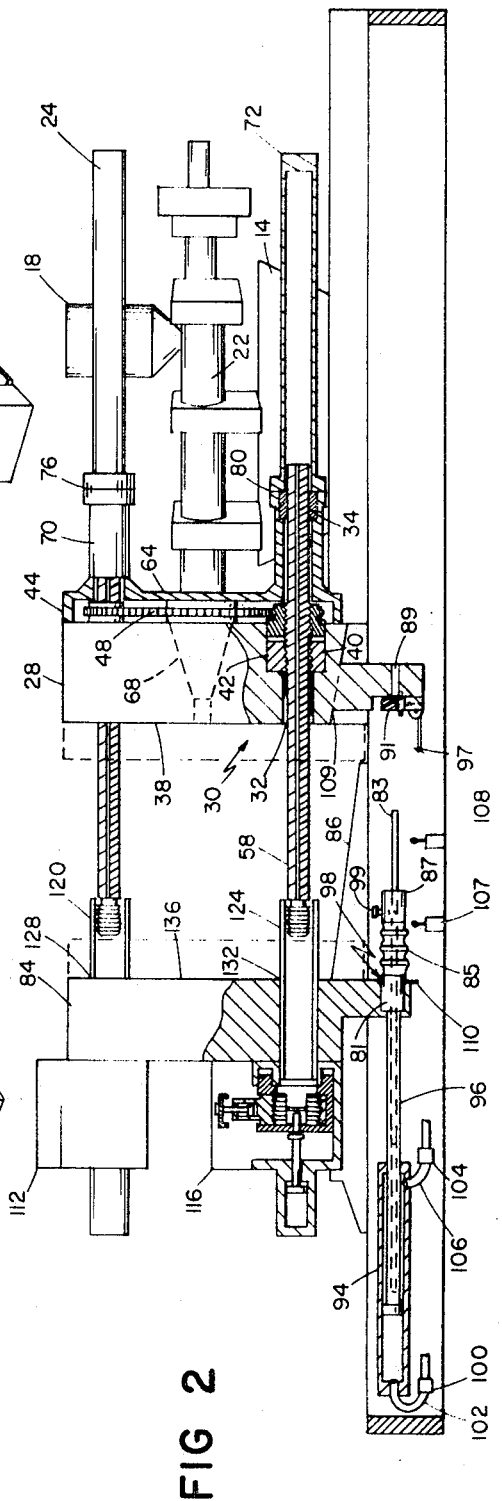

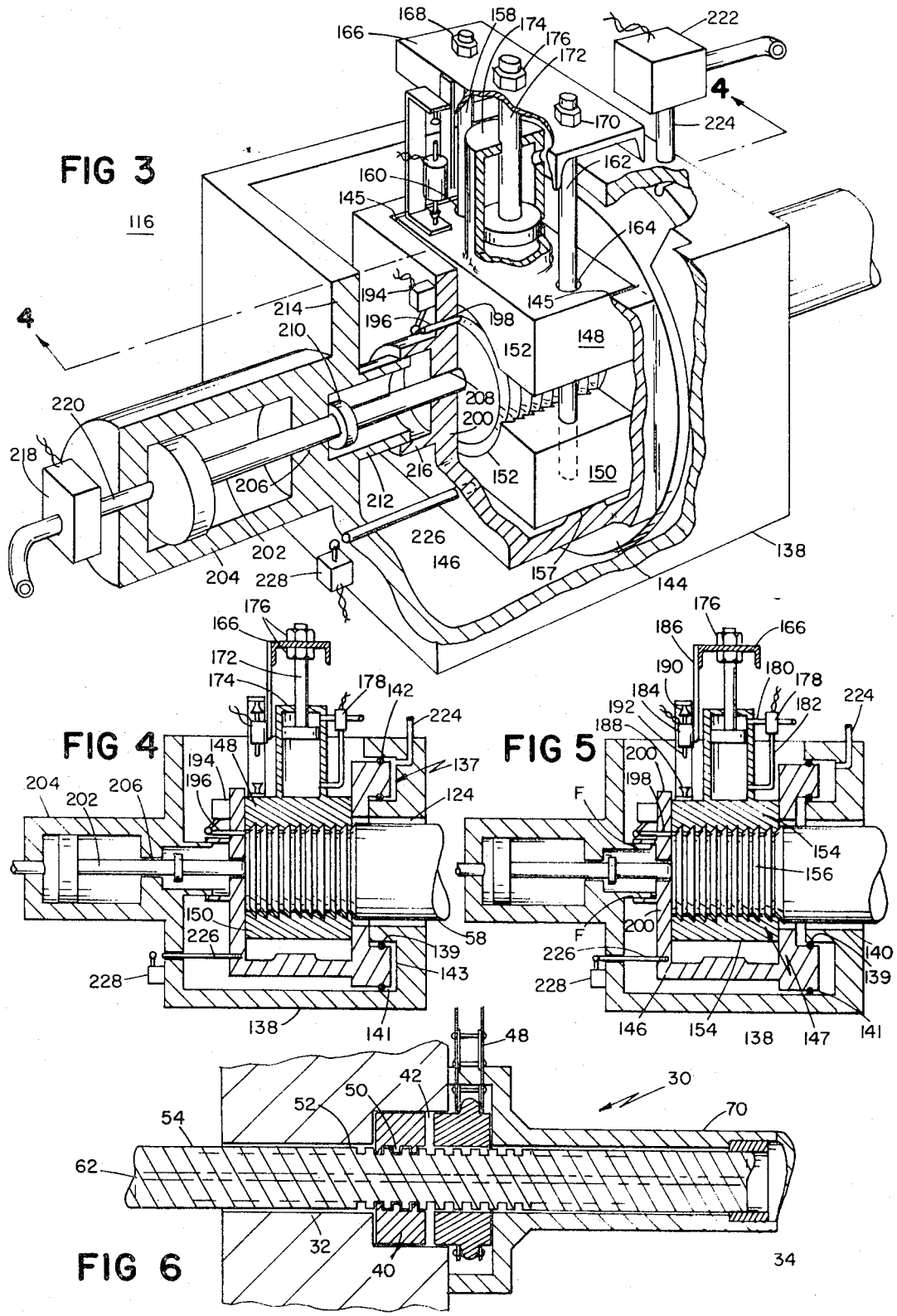

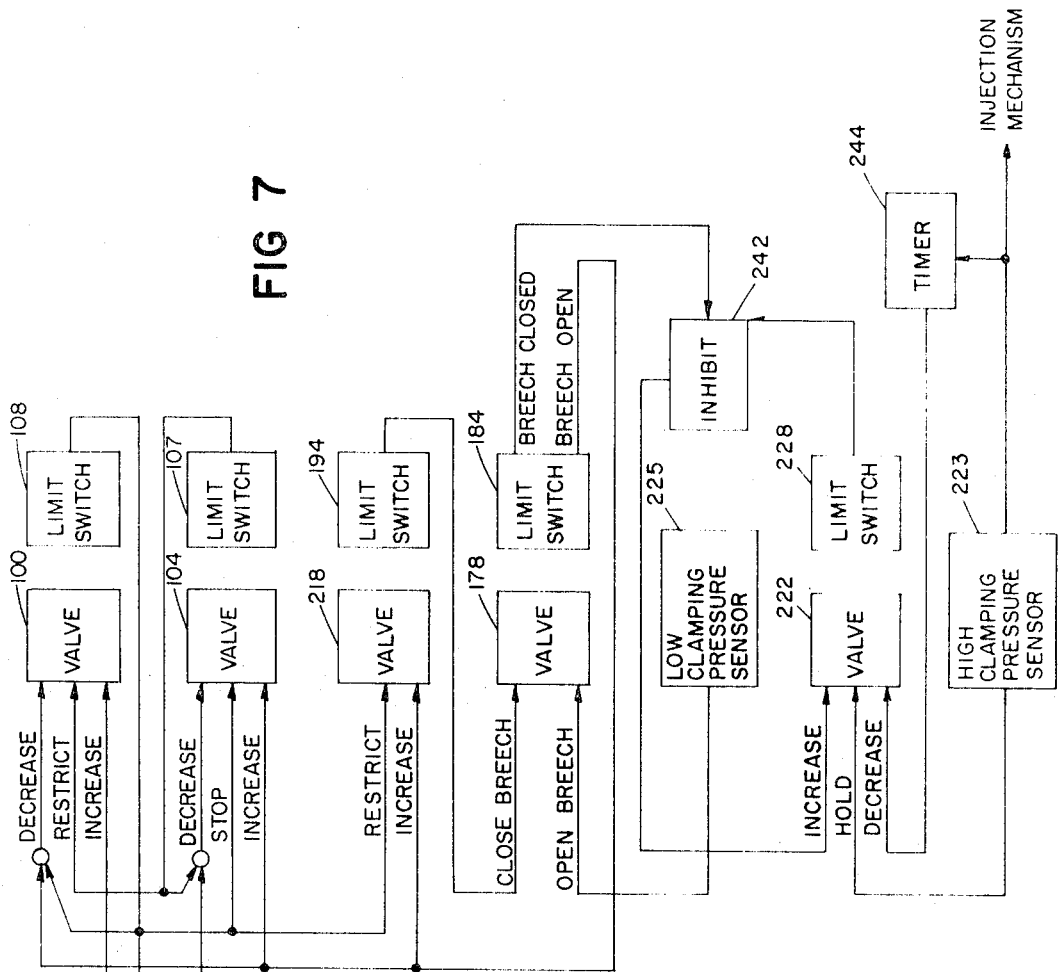
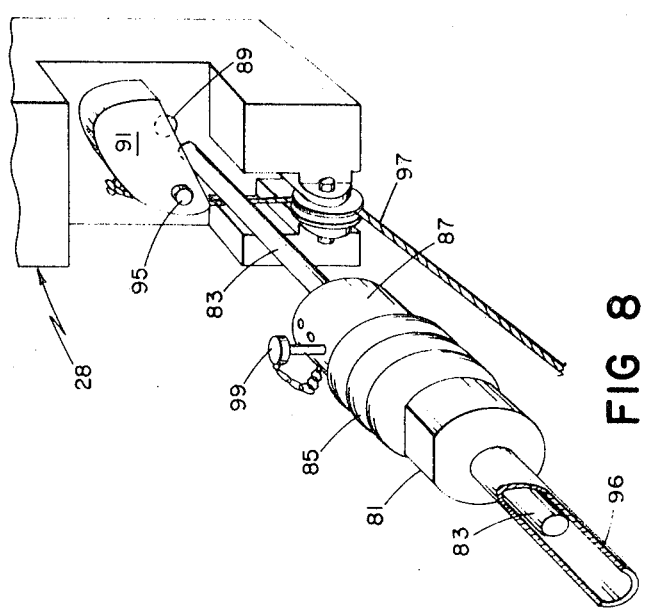

1

3,465,387
TWO-STAGE CLAMPING MACHINE
Harrie Martin Allard and Helmut Gerhard Hoeschel,
Nashua, N.H., assignors to Improved Machinery Inc.,
Nashua, N.H., a corporation of Delaware
Filed June 12, 1967, Ser. No. 645,156
Int. Cl. B29f 1/06
U.S. Cl. 18—30                                   13 Claims

ABSTRACT OF THE DISCLOSURE

An injection molding machine having a first platen mounted to the base of the machine and a second platen slidable on the base. A plurality of tie rods are mounted on the first platen, and a retraction mechanism is provided for withdrawing and extending the tie rods relative to the mold area. A drive system for moving the second platen includes: a relatively low power, long travel driving means used to move the second platen and to arrest and cushion it as it stops; a clamping pad for each tie rod having self-centering, fast-acting breech couplings for connecting and disconnecting, and a hydraulic load cell, having a movable member on which the breech mechanism is mounted, for applying the final clamping force to the mold; a hydraulic push-back cylinder aids separation of the first and second platens during initial opening of the mold and aids deceleration of the second platen as the platens approach the closed positions.

---

This invention relates to high clamping force molding machines.

The clamping section of injection molding machines and similar press devices is intended to support mold halves of various dimensions, hold the mold halves uniformly and precisely together with a very great clamping force that is sufficient to prevent an opening of the mold halves under the high injection pressures which are applied during the molding process, provide an opening force large enough to separate the mold halves, provide an opening stroke that results in convenient space for the removal of the molded product, and provide a controlled closing action that brings the mold halves back to the closed position after the molded piece has been removed and before applying the clamping pressure again for a new molding cycle.

In the conventional clamp design, a fixed platen is bolted to a base that carries an injector unit. An auxiliary clamping platen is floatingly supported on the base, and a plurality of tie rods connect both platens to form a relatively rigid structure in which the distance between the platens may be adjustable or fixed. A third platen, which is normally called the moving platen, is located between the fixed platen and the clamping platen, and is guided and supported by the base and tie rods. The mold halves are fastened to the fixed platen and the moving platen so that one mold half communicates through a passage in the fixed platen with the injector unit. The other mold half is bolted to the moving platen which is often provided with an ejector device that effects the removal of the product from the movable mold half. The driving mechanism is centered at the common center of the tie rods and is located in the space between the moving platen and the clamping platen, and exerts force directly on these platens. In this conventional design, the clamping platen provides support for the drive mechanism, transfers the force to the tie rods which again transfer this clamping force back to the fixed platen, and supports and locates the tie rods.

The transfer of such large forces from one member to another requires precisely fitting and specially designed

2 equipment in order to sustain the repeated applications of the large loads. Also, in order to utilize the heavy clamp members in an economic manner, it is very important that the various tie rods take about an even share of the load, and are not subjected to undue bending forces. This necessitates a very careful tie rod installation, especially when the tie rods are used for guiding or supporting the moving platen. The required precision and extra care result in an increased cost and in dependence on skilled labor. Also, the described conventional three-platen clamp construction with nonretractable tie rods results in a relatively long clamp which requires costly floor space. In addition to that, the tie rods which are located around the mold area make the mold installation difficult. Some large molds can be installed only after removing one or both of the upper precision fit tie rods. This is time consuming and requires skilled labor which is usually not available to the molder. Furthermore, an error in the reinstallation of the tie rods can result in unequal loading and a faulty clamp operation with an early failure of the overstressed parts.

It is, therefore, an object of this invention to provide a molding machine in which mold installation and removal may be accomplished quickly and easily without the aid of specially skilled labor and without the disconnection of the tie rods, which provides a long, low power stroke of the moving platen between open and closed positions sufficient to easily remove and replace molds, yet has a short, powerful clamping stroke, which is substantially reduced in size and weight and uses but two platens, and which provides an independent drive mechanism associated with each tie rod to insure balanced loading and individual alignment of the tie rods.

The invention, generally considered, features an injection molding machine having a first platen and a second platen movable relative to the first platen; and a drive system moves the second platen, relative to the first platen. A plurality of tie rods are mounted on one of the platens, and a retraction mechanism is provided for withdrawing and extending the tie rods relative to the mold area and to the one of the platens on which the tie rods are mounted.

Also, preferably the drive system of the invention features: a relatively low power, long stroke hydraulic cylinder with a piston movable therein, the cylinder acting both to move the second platen and to decelerate the slidable platen as it approaches the open and closed positions, a clamping pad having a hydraulic breech mechanism for gripping the ends of the tie rods, and a hydraulic load cell, having a movable member on which the breech mechanism is mounted, for applying the final clamping force to the mold; a hydraulic push-back cylinder for aiding separation of the first and second platens during initial opening of the mold and for absorbing shock as the pad engages one of the tie rods.

Also, preferably there is a retraction mechanism mounted on the first platen for removing the tie rods from the mold area of the machine through the first platen.

Other objects, features, and advantages will appear from the following description of the invention, taken together with the attached drawings thereof, in which:

FIG. 1 is a perspective view of an injection molding machine according to this invention;

FIG. 2 is a diagrammatic elevation view of the machine in FIG. 1 with some parts shown in section;

FIG. 3 is a partially broken away, enlarged, perspective view of a clamping pad of the machine in FIG. 1 with the breech mechanism open;

FIG. 4 is a view taken along line 4—4 of FIG. 3 with the tie rod fully seated in a clamping pad and the breech mechanism closed;

FIG. 5 is a view identical with FIG. 4 with the load cell energized and applying clamping force;

FIG. 6 is a sectional view of a portion of the retraction mechanism used to move the tie rods;

FIG. 7 is a schematic of the control system of the machine; and

FIG. 8 is an enlarged axonometric view of a portion of the machine of FIGS. 1 and 2 showing a mechanical safety lockout device.

There is shown in the drawings an injection molding machine having a base or support 10 which supports table 12 on which carriage 14 is slidably mounted. Injection unit 16 includes a hopper 18, a feed device 20, and an injection ram device 22. Ram device 22 is offset to permit feed device 20 to be centered axially on the machine in order to avoid conflict between hopper 18 and tie rod retraction tubes 24 and 26.

Fixed platen 28 mounted on base 10 carries four retraction units 30, FIG. 6, each one of which includes a bore 32 communicating with the front face 38 of fixed platen 28, a threaded block 40 which is keyed against rotation in counterbore 42 in the rear face 44 of fixed platen 28, and which receives the main thrust of the load on the tie rods, a sprocket 46, mounted partially within counterbore 42, and a chain 48 which interconnects the four sprockets 46 with motor 47. Threaded bearing block 40 is keyed against rotation in fixed platen 28 and has internal threads 50 which engage external threads 52 on a portion of an associated one of tie rods 54, 56, 58 and 60 (60 is not visible). Sprocket 46 is keyed to rotate with a tie rod but is secured against axial movement in counterbore 42; keyway 62 allows a tie rod to slide through sprocket 46 while rotating with it.

Web 64, FIG. 1, covers chain 48; injection unit 16 communicates with the mold through passage 66 in web 64, passage 68 in fixed platen 28, and a corresponding passage in the mold (not shown). The remainder of the retraction mechanism, the four retraction units 30, are each covered by a housing 70 mounted to fixed platen 28 and supporting retraction tubes 24, 26, 72 and 74 by means of flanged joints 76, 78, 80 and 82 (82 is not visible).

A second tie rod bearing block 34 is mounted in housing 70 spaced from bearing block 40 so that blocks 34 and 40 together provide a cantilever type support for the tie rod. The support provided in this manner by blocks 34 and 40 is sufficiently firm to limit misalignment of the tie rod ends to a maximum of 1/32 inch. This is within workable limits and does not strain the tie rods.

Moving platen 84 mounted on shoes 86 and 88, slidable on runners 90 and 92 on base 10, is driven between an open and a closed position relative to fixed platen 28 by hydraulic fluid in traversing cylinder 94 applied to piston rod 96, which is connected to retainer 98.

Retainer 98 includes a steel section 81 mounted to platen 84 and attached to piston 96. Safety rod 83 slidably mounted in aligned bores in piston 96, section 81, and resilient shock absorber pad 85, is held by pin 99 against sliding movement relative to securing section 87 mounted in the forward end of pad 85, FIG. 8. A number of holes are provided to receive pin 99 in section 87 to allow the positioning of rod 83 to be adjusted for various mold sizes. Safety rod 83 will be received in bore 89 in platen 28 when drop plate 91 is lifted from its path. Drop plate 91 is normally down in the blocking position when certain safety devices, such as gate 93 are not set, FIG. 1; when the device is properly set it mechanically rotates drop plate 91 out of the way of bore 89 about pivot 95 by means of cable 97. Cable 97 is connected to gate 93 which moves in the same directions as platen 84 to give access to the mold area, so that cable 97 is only drawn to rotate plate 91 from in front of bore 89 when gate 93 is completely closed, barring access to the mold area. Since the power developed in cylinder 94 is quite small, obstruction of rod 83 by drop plate 91 is sufficient to prevent further motion of platen 84. Shoes 86 and 88 are receivable in recesses 89 in fixed platen 28 along runners 90 and 92. Each shoe contains a pair of guide plates (not shown) at each end; each of the eight guide plates may be individually adjustable for precisely positioning shoes 86, 88 on runners 90, 92 for proper alignment of the shoes with recesses 101. Hydraulic fluid flow at the head end of cylinder 94 is controlled by electrically controlled valve 100 in line 102 and at the rod end by electrically controlled valve 104 in line 106. Limit switch 107 senses that moving platen 84 is nearing its open position and limit switch 108 that it is nearing its closed position by means of actuator 110 on retainer 98.

Mounted on moving platen 84 are four identical clamping pads 112, 114, 116, and 118 (118 is not visible), FIG. 3, for receiving the rods 54, 56, 58 and 60, respectively, through corresponding sleeves 120, 122, 124, and 126 which are mounted at bores 128, 130, 132, and 134 and extend beyond face 136 of moving platen 84. These sleeves are of sufficient length to prevent the tie rods from ever being completely withdrawn from them; thus they prevent tubes, hoses and any other objects from getting caught between the tie rods and bores 128, 130, 132 and 134 and their associated clamping pads.

The structure of a clamping pad is described in detail, with reference to clamping pad 116. Load cell 137 includes a housing 138 having a bore 140 which communicates with bore 132 for receiving sleeve 124, and having a recess or annular channel 143, FIGS. 4 and 5, concentric with bore 140 for receiving annular section 142 of movable member 144. Mounted on movable member 144 is chamber 146 which contains breech mechanism 147. Upper and lower breech blocks 148 and 150 each have a semicircular recess 152 containing grooves 154 which engage similar grooves 156 on the end of the rod 58.

The structure of clamping pad 116 and breech mechanism 147 permits a substantial horizontal and vertical deviation of the free end of the tie rod from its longitudinal axis when engaging the clamping pad. Bore 140 is sized to receive sleeve 124 which has an inner diameter substantially the diameter of tie rod 58. The width of annular section 142 may be slightly less than the width of annular channel 143, shown exaggerated in FIGS. 4 and 5, to enable load cell 137 to float within gaskets 139 and 141 and tolerate substantial deviation of tie rod 58 from its longitudinal axis. Breech blocks 148 and 150 clear chamber 146 to provide gaps 145 which provide for acceptance of tie rod 58 in breech mechanism 147 when the free end of the rod is displaced horizontally in the direction transverse to the longitudinal axis of the rod. These tolerances permit clamping pad 116 to be self-centering with respect to its tie rod and is important in the machine of this invention which employs tie rods having one end free and unsupported.

Connecting rod 158 passes through bore 160 in upper breech block 148 and is fastened to lower breech block 150; similarly, connecting rod 162 passes through bore 164 in upper breech block 148 and is fastened to lower breech block 150. Rods 158 and 162 are fastened to bracket 166 by means of nut pairs 168 and 170 and bracket 166 is fastened to piston rod 172, slidable in cylinder 174, by nut pair 176; cylinder 174 is mounted on upper breech block 148. Pad 157 forms a support for the breech mechanism 147 in its extended open position. Electrically controlled valve 178 controls direction of flow to either the head end of cylinder 174 over line 182 and at the rod end over line 180. Limit switch 184 suspended from bracket 166 on arm 186 senses the open and closed positions of the breech blocks by means of actuators 188 and 190, respectively, mounted on support 192.

Limit switch 194 is tripped as actuator pin 196, slidable in passage 198 in rear wall 200 of chamber 146, encounters the end of tie rod 58 as it seats in the breech mechanism.

Piston rod 202, in push-back cylinder 204 mounted on housing 138, extends through bore 206 in cylinder 204 and through bore 208 in wall 200 to contact the end of tie rod 58. Stop ring 210 is fixed to piston rod 202 to positively limit its travel. Bored neck 212, extending from wall 214 of housing 128, slidably engages collar 216, extending from wall 200 of chamber 146 thereby guiding the travel of movable member 144. Collar 216 and neck 212 are provided with tolerance dimensions similar to those of section 142 and channel 143 to further aid the self-centering action of load cell 137. Electrically controlled valve 218 controls hydraulic fluid flow in cylinder 204 over line 220. The hydraulic flow to load cell 136 is controlled by electrically controlled valve 222 over line 224; overdriving load cell 137 causes actuator pin 226 to trip limit switch 228. Signals to and from the various sensing switches and valves are coordinated by the control system in control panel 230, FIG. 1.

For unobstructed mold installation, with platens 28 and 84 opened as shown in FIGS. 1 and 2, motor 47 is energized to drive chain 48 and sprockets 46 in the retraction direction. Sprockets 46 rotate tie rods 54, 56, 58 and 60 in threaded blocks 40 and cause the tie rods to move rearward toward the ends of the retraction tubes 24, 26, 72 and 74. With the tie rods fully retracted, there is ample space to move the mold halves between platens 28 and 84 and maneuver them into mounting position on their respective platens. When the mounting of the mold halves is completed, motor 47 is driven in the opposite direction, advancing the tie rods and completing the mold installation.

A molding cycle is begun by placing on-off switch 232, FIG. 7, in the on position and depressing start switch 234. Hydraulic motor 236, the main hydraulic power source of the machine, is thereby energized and its power is available to valves 100, 104, 178, 218 and 222. With both signals applied at its input AND circuit 238 provides a signal through circuit 240, presently not inhibited, to cause valve 100 to permit increased flow to the head end of traversing cylinder 94, and to cause valve 104 to allow the release of the hydraulic fluid from the rod end of cylinder 94. This condition causes moving platen 84 to move forward toward fixed platen 28. The forward motion of platen 84 continues until actuator 110 trips limit switch 108 precipitating a signal to valve 100 reducing the flow to piston rod 96, to valve 104 stopping the flow from the rod end of cylinder 94, causing cylinder 94 to act as a shock absorber during the last portion of the travel of the moving plates, to valve 218 to restrict the flow from push-back cylinder 204 providing another shock-absorbing function as rod 202 encounters the end of a tie rod, and to inhibit circuit 240 to inhibit the signal from AND circuit 238. If gate 93 is properly closed, cable 97 is biasing drop plate 91 out of the way of safety rod 83 which is approaching bore 89. As moving platen 84 is driven to the closed position, sleeves 120, 122, 124, and 126 receive, even more deeply, tie rods 54, 56, 58 and 60, respectively, until the tie rods are in the breech mechanisms 147 of their respective clamping pads 112, 114, 116 and 118. Just before moving platen 84 arrives at the closed position in which the mold halves are touching, actuator pin 196 contacts its associated tie rod and trips switch 194. Switch 194 is tripped when the tie rod is fully seated in breech mechanism 147, precipitating a signal to valve 178 to increase the pressure to cylinder 174 over line 182. This increase drives breech block 148 downward toward the tie rod and drives piston rod 172, thus breech block 150, upward toward the tie rod. Switch 184 moves with bracket 166 and is tripped when the breech blocks are closed, sending a signal to valve 222 to increase the pressure to load cell 137 over line 224, and drive movable member 144 and breech mechanism 146 to the left as shown in FIGS. 4 and 5.

At this point, valve 222 is shut, isolating load cell 137 from the hydraulic system. As load cell 137 and breech mechanism 147 receive rod 58, the initial shock is partially absorbed by the action of the hydraulic fluid retained in the load cell. The forward motion of the rod as it engages the pad 116 is opposed by the vacuum or low pressure which tends to be created in the hydraulic fluid of the load cell by this motion, providing an additional shock absorbing effect. In addition to shock absorbing, this feature supplies a longitudinal self-centering action which provides a proper engagement of each clamp pad 116 with its respective tie rod even when the ends of the rods do not simultaneously contact their respective pads. Actuator pin 226 then trips limit switch 228 providing a signal to inhibit circuit 242 if load cell 137 is overdriven, thereby preventing further increase in pressure through valve 222.

The signal from switch 184 signifying that the breech mechanism is closed is also applied to valve 222 through inhibit circuit 242 to increase the pressure applied to load cell 137. When the clamping pressure rises to 2,000 pounds per square inch, high clamping pressure sensor 223 triggers valve 222 to stop increasing the pressure and hold it at that level, while simultaneously signalling timer 244 to begin its cycle and signalling the injector mechanism to inject its plastic material into the mold. After a predetermined period of time, dependent upon the needs of individual molding operations, timer 244 provides a signal to valve 222 to decrease the pressure on load cell 137. When the pressure has decreased to some predetermined level as sensed by low clamping pressure sensor 225, a signal is delivered to valve 178 to cause it to open the breech mechanism. As the breech blocks retreat from the tie rod, a second segment of switch 184 is actuated which signals valve 104 to increase the pressure in the rod end of cylinder 94, signals valve 100 to decrease the pressure in the head end of cylinder 94, and signals valve 218 to increase the pressure in push-back cylinder 204, providing an extra starting force to move platen 84. Moving platen 84 moves backward, away from fixed platen 28 in this manner until limit swtich 107 is tripped by actuator 110. Tripping switch 107 sends a signal to valve 104 decreasing the fluid flow through it to the rod end of cylinder 94 and a signal to valve 100 to restrict the flow of hydraulic fluid from the head end of cylinder 94. The action of valve 100 provides a shock-absorbing function to gently decelerate moving platen 84.

Other embodiments will occur to those skilled in the art and are within the following claims.

What is claimed is:

1. A molding machine comprising a first platen, a second platen spaced from said first platen by a mold area and movable towards and away from said first platen, drive means for driving said second platen towards and away from said first platen, a plurality of tie rods mounted on one of said platens to longitudinally project from said one platen towards the other thereof, said one platen and said tie rods being selectively relatively movable for adjustment of the lenghs of said tie rods projecting from said one platen towards said other platen, adjustment means separate from said drive means and selectively operable for relatively moving said one platen and said tie rods to alternatively increase and reduce said lengths of all of said tie rods simultaneously, said drive means including a cylinder and a piston in said cylinder, said cylinder and piston being relatively movable and one thereof being connected to said second platen for movement therewith, first valve means regulating fluid flow into and out of an end of said cylinder, second valve means regulating fluid flow into and out of the other end of said cylinder, and means for directing one of said valve means to pass fluid to one end of said cylinder and directing the other of said valve means to permit fluid to escape from the other end of said cylinder, thereby moving said second platen, and directing said one of said valve means to prevent further application of pressure and said other of said valve means to restrict the escape of said fluid before said second platen reaches the end of its travel, the restricting action of said other of said valve means providing a fluid damping to cushion the deceleration of said second platen.

2. A molding machine comprising a first platen, a second platen spaced from said first platen by a mold area and movable towards and away from said first platen, drive means for driving said second platen towards and away from said first platen, a plurality of tie rods mounted on one of said platens to longitudinally project from said one platen towards the other thereof, said one platen and said tie rods being selectively relatively movable for adjustment of the lengths of said tie rods projecting from said one platen towards said other platen, adjustment means separate from said drive means and selectively operable for relatively moving said one platen and said tie rods to alternatively increase and reduce said lengths of all of said tie rods simultaneously, and said other platen being provided with a fluid powered breech mechanism for gripping each of said tie rods, said breech mechanisms each comprising a plurality of breech blocks cooperative to grip a tie rod, said breech mechanisms each also comprising a plurality of connecting rods mounted to one of said breech blocks, a bracket mounted on said connecting rods and a fluid powered cylinder-and-piston means having a piston connected to said bracket and a cylinder connected to the other of said breech blocks whereby pressurized fluid in said cylinder is operable to move said piston and cylinder to thereby drive said breech blocks simultaneously in opposing directions.

3. A molding machine comprising a first platen, a second platen spaced from said first platen by a mold area and movable towards and away from said first platen, drive means for driving said second platen towards and away from said first platen, a plurality of tie rods mounted on one of said platens to longitudinally project from said one platen towards the other thereof, said one platen and said tie rods being selectively relatively movable for adjustment of the lengths of said tie rods projecting from said one platen towards said other platen, adjustment means separate from said drive means and selectively operable for relatively moving said one platen and said tie rods to alternatively increase and reduce said lengths of all of said tie rods simultaneously, and said other platen being provided with a clamping pad comprising a fluid powered breech mechanism for gripping a tie rod, a fluid operated load cell, having a movable member on which said breech mechanism is mounted, for applying the final clamping force to a mold between said platens, fluid operated push-back cylinder-and-piston means for aiding separation of said first and second platens during initial opening of the mold and for absorbing shock as said pad engages one of said tie rods, a first limit switch for sensing a tie rod fully seated in said breech mechanism, a first valve responsive to said first limit switch for energizing said breech mechanism and closing it on the fully seated tie rod, a second limit switch for sensing said breech mechanism closed on the tie rod, a second valve responsive to said second limit switch for energizing said load cell and applying the final clamping force to the mold, and a third limit switch for sensing an overdriven load cell and controlling its energization through said second valve.

4. A molding machine comprising a first platen, a second platen spaced from said first platen by a mold area and movable towards and away from said first platen, drive means for driving said second platen towards and away from said first platen, a plurality of tie rods mounted on one of said platens to longitudinally project from said one platen towards the other thereof, said one platen and said tie rods being selectively relatively movable for adjustment of the lengths of said tie rods projecting from said one platen towards said other platen, adjustment means separate from said drive means and selectively operable for relatively moving said one platen and said tie rods to alternatively increase and reduce said lengths of all of said tie rods simultaneously, and push-back cylinder-and-piston means including a cylinder and a piston slidably in said cylinder, valve means for regulating fluid flow in the head end of said cylinder, the rod end of said piston maintaining contact with one of said tie rods within a predetermined distance of its position corresponding to the closed mold position, and control means for directing said valve means to pass fluid under pressure to said head end of said cylinder, causing said rod end of said piston to exert a force on said one of said tie rods to begin the parting of the molds, and for directing said valve means to restrict the escape of said fluid from said head end of said cylinder during closing of the molds as said rod end of said piston contacts said one of said tie rods, the restricting action of said valve means providing a fluid damping to cushion the seating of said one of said tie rods.

5. A molding machine comprising a first platen, a second platen spaced from said first platen by a mold area and movable towards and away from said first platen, drive means for driving said second platen towards and away from said first platen, a plurality of tie rods mounted on one of said platens to longitudinally project from said one platen towards the other thereof, said one platen and said tie rods being selectively relatively movable for adjustment of the lengths of said tie rods projecting from said one platen towards said other platen, adjustment means separate from said drive means and selectively operable for relatively moving said one platen and said tie rods to alternatively increase and reduce said lengths of all of said tie rods simultaneously, and a safety mechanism which includes a safety rod projecting from one of said platens towards the other thereof, an opening in such other platen for receiving said safety rod, a closure plate in association with said opening movable between a first position preventing entrance of said safety rod into said opening and a second position permitting said entrance, access preventing means movable between a position preventing access to said mold area and a position permitting said access, and cable means connected to said closure plate and to said access preventing means whereby said closure plate is retained in its said first position when said access preventing means permits access to said mold area.

6. A molding machine according to claim 5, wherein said drive means comprises a cylinder and a piston slidably in said cylinder, said piston being connected to said second platen for movement therewith, said safety rod is mounted as a longitudinal extension of said piston in the direction of said first platen, and said opening is in said first platen.

7. A molding machine comprising a first platen, a second platen movable towards and away from said first platen, a plurality of tie rods mounted on one of said platens to longitudinally project towards the other thereof, a plurality of clamping pads associated with the other of said platens and each including a breech mechanism for gripping one of said tie rods, said breech mechanisms each including a pair of breech blocks cooperative to grip a tie rod, a pair of connecting rods mounted to one of said breech blocks, a bracket mounted on said connecting rods, and fluid operated cylinder-and-piston means including a piston connected to said bracket and a cylinder mounted on the other of said breech blocks whereby pressurized fluid in said cylinder is operable to move said cylinder and piston to thereby drive said breech blocks in opposing directions.

8. A molding machine comprising a first platen, a second platen movable towards and away from said first platen, a plurality of tie rods mounted on one of said platens to longitudinally project towards the other thereof, clamping means associated with the other of said platens and including a breech mechanism for gripping one of said tie rods, said breech mechanism including a pair of breech blocks cooperative to grip a tie rod, and said breech mechanism further including fluid operated cylinder-and-piston means having a cylinder connected to one of said breech blocks and a piston slidably in said cylinder and connected to the other of said breech blocks whereby pressurized fluid in said cylinder is operable to drive said cylinder and piston in opposite directions to thereby drive said breech blocks in opposing directions.

9. A molding machine comprising a first platen, a second platen movable towards and away from said first platen, a plurality of tie rods mounted on one of said platens to longitudinally project towards the other thereof, drive means for driving said second platen towards and away from said first platen, said drive means comprising push-back cylinder-and-piston means for aiding the movement of said second platen from said first platen during the initial opening of a mold therebetween, said push-back cylinder-and-piston means including a cylinder and a piston slidably in said cylinder, and valve means for reguating fluid flow into the head end of said cylinder, the rod end of said piston maintaining contact with one of said tie rods within a predetermined distance of its fully seated position corresponding to the closed position of a mold between said platens.

10. A molding machine according to claim 9, further including control means for directing said valve means to pass fluid to said head end of said cylinder causing said rod end of said piston to exert a force on said one of said tie rods to begin the parting of the molds, and for directing said valve means to restrict the escape of said fluid from said head end of said cylinder during closing of the molds as said rod end of said piston contacts said one of said tie rods, the restricting action of said valve means providing a fluid damping to cushion the seating of said one of said tie rods.

11. A molding machine comprising a first platen, a second platen movable towards and away from said first platen, a plurality of tie rods mounted on one of said platens to longitudinally project towards the other thereof, clamping means associated with the other of said platens including at least one breech mechanism for gripping one of said tie rods, said breech mechanism being movably mounted in a chamber and including a plurality of breech blocks cooperative to grip said one of said tie rods, said breech blocks being of a lateral dimension transverse to the longitudinal axis of said one tie rod significantly less than the corresponding internal dimension of said chamber for allowing lateral self-centering of said tie rod in said breech mechanism.

12. A molding machine according to claim 11, wherein said chamber is in a movable member which is laterally movable.

13. A molding machine according to claim 11, further comprising push-back cylinder-and-piston means for aiding the movement of said second platen from said first platen during the initial opening of a mold therebetween, said push-back cylinder-and-piston means including a cylinder and a piston slidably in said cylinder, and valve means for regulating fluid flow into the head end of said cylinder, the rod end of said piston maintaining contact with said one of said tie rods within a predetermined distance of its fully seated position corresponding to the closed position of a mold between said platens.

References Cited

UNITED STATES PATENTS

| 2,862,238 | 12/1958 | Cuzzi. |
| 2,916,768 | 12/1959 | Quere et al. |
| 2,976,569 | 3/1961 | Quere et al. |
| 3,120,039 | 2/1964 | Stubbe et al. |
| 3,208,105 | 9/1965 | White. |
| 3,310,841 | 3/1967 | Hehl. |

FOREIGN PATENTS

| 262,875 | 4/1963 | Australia. |

WILBUR L. McBAY, Primary Examiner

U.S. Cl. X.R.

18—16, 43; 164—343